US00RE46648E

(19) United States
(12) Reissued Patent
Wang

(10) Patent Number: US RE46,648 E
(45) Date of Reissued Patent: Dec. 26, 2017

(54) POLISHING PAD, POLISHING METHOD AND METHOD OF FORMING POLISHING PAD

(71) Applicant: IV Technologies Co., Ltd., Taichung (TW)

(72) Inventor: Yu-Piao Wang, Jubei (TW)

(73) Assignee: IV Technologies Co., Ltd., Taichung (TW)

(21) Appl. No.: 14/793,416

(22) Filed: Jul. 7, 2015

Related U.S. Patent Documents

Reissue of:
(64) Patent No.: 8,496,512
Issued: Jul. 30, 2013
Appl. No.: 13/648,971
Filed: Oct. 10, 2012

U.S. Applications:
(62) Division of application No. 12/428,231, filed on Apr. 22, 2009, now Pat. No. 8,303,378.

(30) Foreign Application Priority Data

Jul. 9, 2008 (TW) ..... 97125981 A

(51) Int. Cl.
*B24B 1/00* (2006.01)
*B24B 37/26* (2012.01)

(52) U.S. Cl.
CPC ..... *B24B 37/26* (2013.01)

(58) Field of Classification Search
CPC ..... B24B 37/26
USPC ..... 451/59, 527, 529, 548, 287
See application file for complete search history.

(56) References Cited

U.S. PATENT DOCUMENTS 5,117,908 A 6/1992 Hofmann
5,177,908 A * 1/1993 Tuttle ..... 451/41
5,539,179 A * 7/1996 Nozawa et al. ..... 219/121.43
5,650,039 A * 7/1997 Talieh ..... 216/89
5,690,540 A * 11/1997 Elliott et al. ..... 451/41
5,868,806 A * 2/1999 Nishio et al. ..... 51/297
5,882,251 A * 3/1999 Berman et al. ..... 451/527
5,984,769 A * 11/1999 Bennett et al. ..... 451/527
6,019,666 A * 2/2000 Roberts et al. ..... 451/26
(Continued)

FOREIGN PATENT DOCUMENTS

EP 0 878 270 B1 7/2005
JP 61-297082 A 12/1986
(Continued)

OTHER PUBLICATIONS

Arc (geometry) from Wikipedia, the free encyclopedia, 8 pages, Retrieved Apr. 27, 2017 from: https://en.wikipedia.org/w/index.php?title+Arc_(geometry)&oldid+756746538.*
(Continued)

*Primary Examiner* — Matthew C Graham
(74) *Attorney, Agent, or Firm* — JCIPRNET

(57) ABSTRACT

A polishing pad, a polishing method and a method of forming a polishing pad are provided. The polishing pad includes a polishing layer and a plurality of arc grooves. The arc grooves are disposed in the polishing layer. Each of the arc grooves has two ends, and at least one end thereof has an inclined wall. The angle between the inclined wall of each groove and the surface plane of the polishing layer is less than 90 degree.

24 Claims, 10 Drawing Sheets

(56) References Cited

U.S. PATENT DOCUMENTS

| | | | | |
|---|---|---|---|---|
| 6,238,271 | B1 * | 5/2001 | Cesna | 451/41 |
| 6,312,324 | B1 * | 11/2001 | Mitsui et al. | 451/540 |
| 6,612,916 | B2 * | 9/2003 | Kollodge et al. | 451/527 |
| 6,645,061 | B1 * | 11/2003 | Bennett et al. | 451/527 |
| 6,699,115 | B2 * | 3/2004 | Osterheld et al. | 451/527 |
| 6,729,950 | B2 * | 5/2004 | Park et al. | 451/528 |
| 6,852,020 | B2 * | 2/2005 | Petroski et al. | 451/526 |
| 6,951,506 | B2 * | 10/2005 | Andideh et al. | 451/41 |
| 6,951,510 | B1 * | 10/2005 | Rodriguez et al. | 451/56 |
| 6,955,587 | B2 * | 10/2005 | Muldowney | 451/41 |
| 7,121,938 | B2 * | 10/2006 | Suzuki | 451/527 |
| 7,125,318 | B2 * | 10/2006 | Muldowney | 451/41 |
| 7,140,088 | B2 * | 11/2006 | Suzuki | 29/557 |
| 7,255,633 | B2 * | 8/2007 | Muldowney | 451/56 |
| 7,258,602 | B2 * | 8/2007 | Shih et al. | 451/527 |
| 7,267,610 | B1 * | 9/2007 | Elmufdi et al. | 451/530 |
| 7,516,536 | B2 * | 4/2009 | Suzuki | 29/558 |
| 8,496,512 | B2 | 7/2013 | Wang | |
| 2001/0053660 | A1 * | 12/2001 | Koinkar et al. | 451/56 |
| 2004/0014413 | A1 * | 1/2004 | Kawahashi et al. | 451/527 |
| 2004/0053570 | A1 * | 3/2004 | Naujok | 451/527 |
| 2004/0142637 | A1 * | 7/2004 | Petroski et al. | 451/41 |
| 2006/0148393 | A1 * | 7/2006 | Ono et al. | 451/526 |
| 2009/0311955 | A1 * | 12/2009 | Kerprich et al. | 451/548 |
| 2010/0009601 | A1 * | 1/2010 | Wang | 451/36 |
| 2010/0159811 | A1 * | 6/2010 | Muldowney | 451/527 |
| 2011/0014853 | A1 * | 1/2011 | Wang | 451/28 |

FOREIGN PATENT DOCUMENTS

| | | | |
|---|---|---|---|
| JP | 2003-165049 | * | 6/2003 |
| KR | 20010002471 | A | 1/2001 |
| WO | 2014074521 | A1 | 5/2014 |

OTHER PUBLICATIONS

Office Action for related Chinese Patent Application No. 200810129624.8 dated Jan. 18, 2012, pp. 1-8.

* cited by examiner

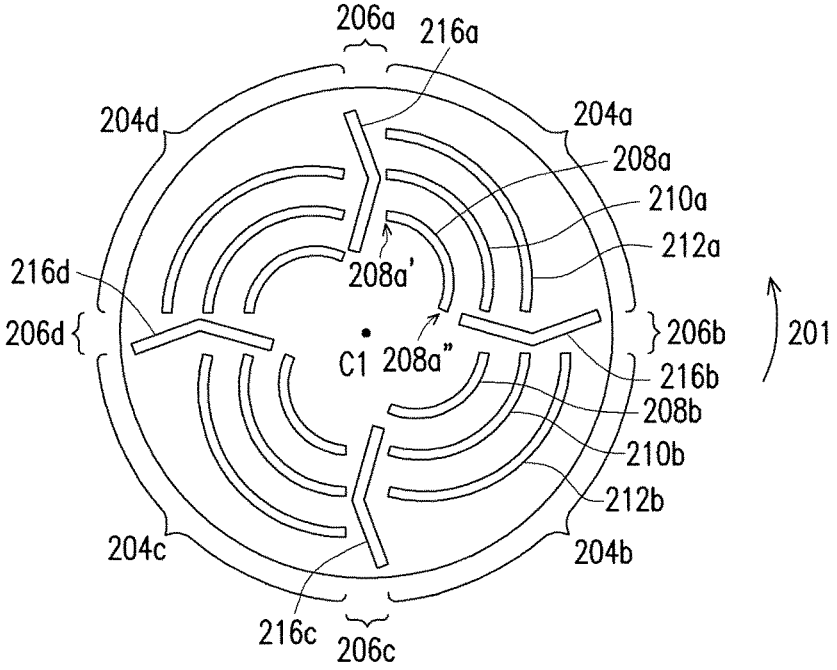
FIG. 8 (NEW)
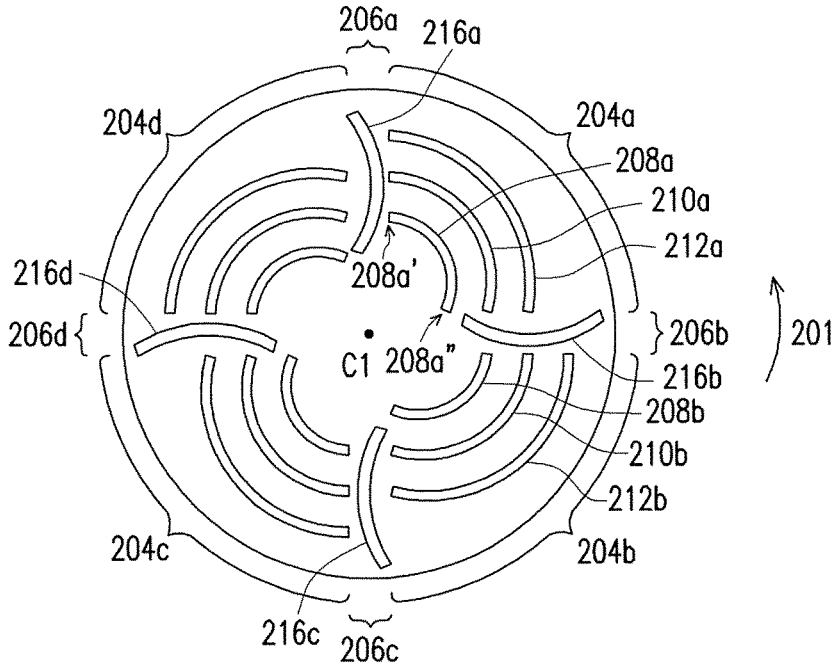
FIG. 9 (NEW)

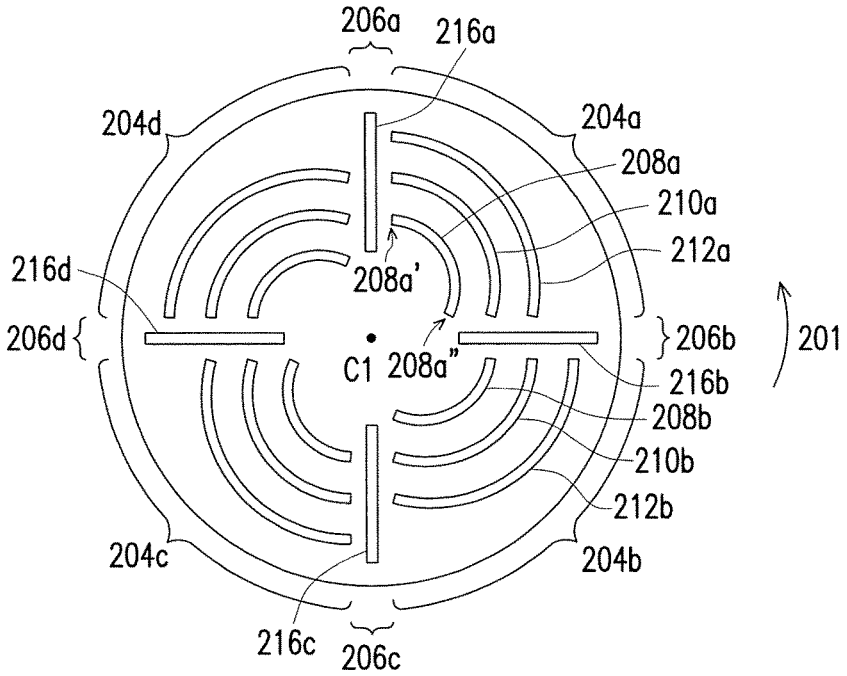
FIG. 10 (NEW)
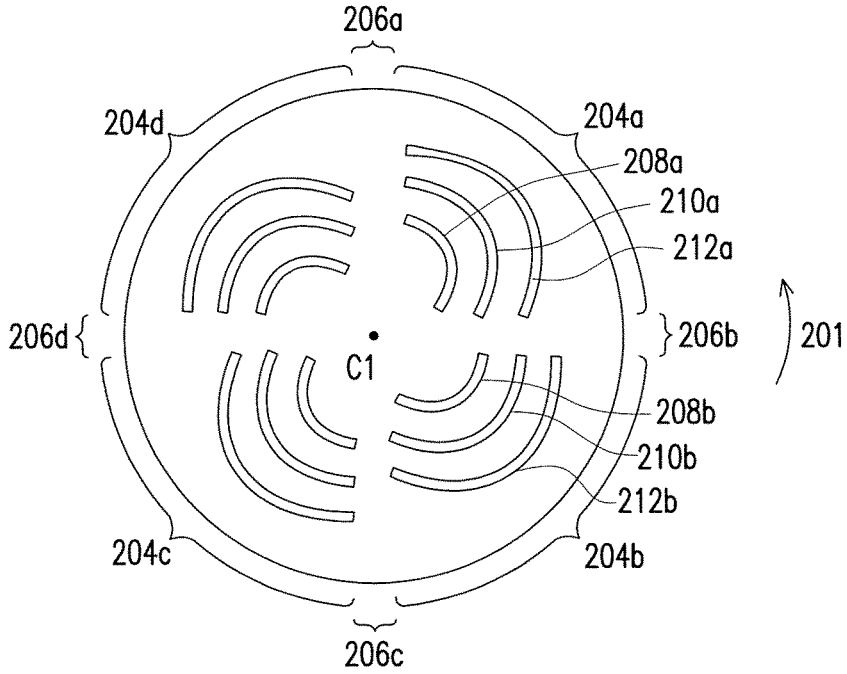
FIG. 11 (NEW)

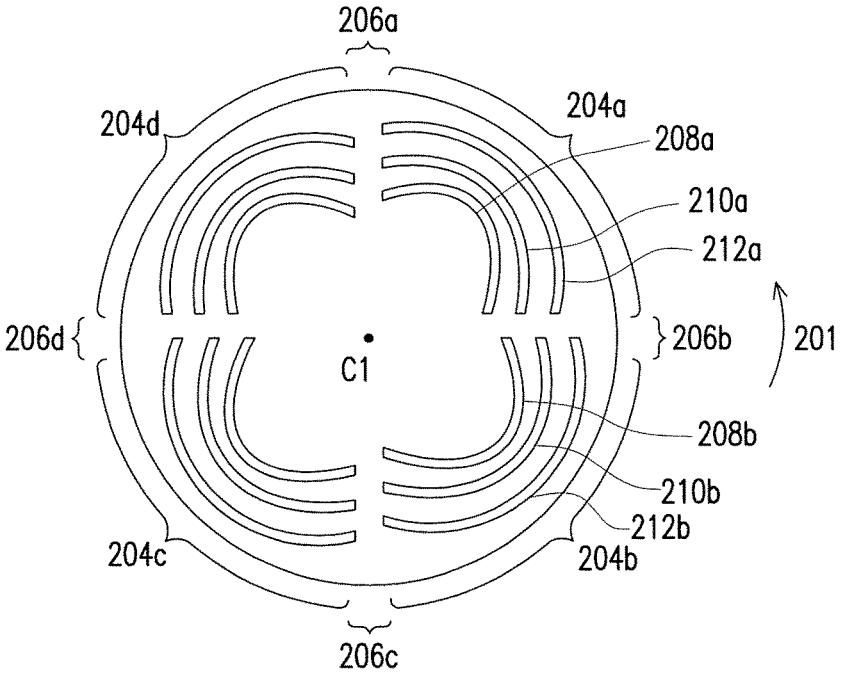
FIG. 12 (NEW)
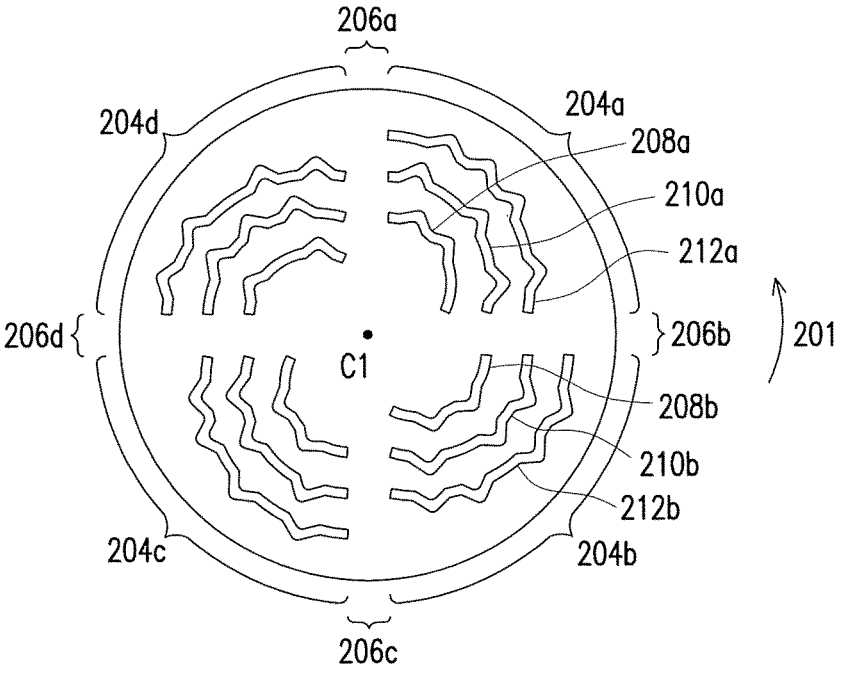
FIG. 13 (NEW)

POLISHING PAD, POLISHING METHOD AND METHOD OF FORMING POLISHING PAD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a divisional of U.S. application Ser. No. 12/428,231, filed on Apr. 22, 2009, which claims the priority benefit of Taiwan application serial No. 97125981, filed on Jul. 9, 2008, the entireties of which are incorporated herein.

BACKGROUND OF THE INVENTION

1. Field of the Invention

The present invention relates to a polishing pad, a polishing method and a method of forming a polishing pad. More particularly, the polishing pad can provide a different slurry flow distribution.

2. Description of Related Art

With the progress of the industry, a planarization process is often adopted as a process for manufacturing various devices. A chemical mechanical polishing (CMP) process is often used in the planarization process in the industry. General speaking, the chemical mechanical polishing process supplies slurry having a chemical on the polishing pad, applies a pressure on the substrate to be polished to press it on the polishing pad, and provides a relative motion between the substrate and the polishing pad. Through the mechanical friction generated by the relative motion and the chemical effects of the slurry, a portion of the surface layer of the substrate is removed to make the surface flat and smooth so as to achieve planarization.

FIG. 1 is a schematic top view of a conventional polishing pad. FIG. 1A is a cross-section view of the polishing pad taken along a line A-A' in FIG. 1. Referring to FIG. 1, a polishing pad 100 includes a polishing layer 102 and a plurality of circumferential grooves 104. The polishing layer 102 is in contact with a surface of a substrate 105 (e.g. a wafer). The plurality of circumferential grooves 104 is disposed in the polishing layer 102 in the manner of concentric circles. The circumferential grooves 104 are used to contain slurry. When the polishing process is performed, the polishing pad 100 moves in a rotational direction 101, for example, a counterclockwise direction as shown in FIG. 1. At the same time when the polishing pad 100 rotates, the slurry is continuously supplied to the polishing pad 100 and flows between the polishing layer 102 and the substrate 105.

As shown in FIG. 1A, part of the slurry flows to the surface of the polishing layer 102 through the centrifugal force generated from the rotation of the polishing pad 100, as shown in a flow direction 103. However, most of the slurry 108 is still contained in the circumferential grooves 104 and only a small portion thereof flows to the surface of the polishing layer 102. The distribution of the slurry has an effect on polishing characteristics during the polishing process.

Therefore, it is needed to provide a polishing pad which can provide a different slurry flow distribution for industry in response to the requirements of various polishing processes.

SUMMARY OF THE INVENTION

Accordingly, the present invention provides a polishing pad and a polishing method using the polishing pad. The polishing pad can provide a different slurry flow distribution.

The present invention further provides a forming method of a polishing pad, wherein the formed polishing pad provides a different slurry flow distribution.

The present invention provides a polishing pad and a polishing method using the polishing pad. The polishing pad includes a polishing layer and a plurality of arc grooves. The plurality of arc grooves are disposed in the polishing layer. Each of the plurality of arc grooves has two ends, and at least one end thereof has an inclined wall. The angle between the inclined wall and the surface plane of the polishing layer is less than 90 degrees.

The present invention further provides a polishing pad and a polishing method using the polishing pad. The polishing pad includes a polishing layer, a plurality of arc grooves, and a polishing surface. The plurality of arc grooves are disposed in the polishing layer and surrounding the rotational axis of the polishing pad. The polishing surface is disposed between the arc grooves and including a first polishing region and a second polishing region. The first polishing region is disposed between neighboring two arc grooves in the circumferential direction. The second polishing region is disposed between neighboring two arc grooves in the radial direction. The first polishing region becomes larger gradually as the polishing surface is abraded downward.

The present invention further provides a polishing pad and a polishing method using the polishing pad. The polishing pad includes a polishing layer and a plurality of arc grooves. The plurality of arc grooves are disposed in the polishing layer to form a plurality of fan-shaped regions, wherein the arc grooves in the same fan-shaped region are concentric arc grooves with unequal radii, and the center of the concentric arc grooves in at least one fan-shaped region does not overlap with the rotational axis of the polishing pad.

The present invention provides a method of forming a polishing pad. First, a polishing layer is provided. Thereafter, a plurality of concave regions is formed in the polishing layer. Afterwards, a plurality of arc grooves is formed in regions outside the concave regions.

The polishing pad of the present invention is a polishing pad which can provide a different slurry flow distribution.

In order to make the above and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

*FIG. 8 is a schematic top view of a polishing pad according to a seventh embodiment of the present invention.*

*FIG. 9 is a schematic top view of a polishing pad according to an eighth embodiment of the present invention.*

*FIG. 10 is a schematic top view of a polishing pad according to a ninth embodiment of the present invention.*

*FIG. 11 is a schematic top view of a polishing pad according to a tenth embodiment of the present invention.*

*FIG. 12 is a schematic top view of a polishing pad according to an eleventh embodiment of the present invention.*

*FIG. 13 is a schematic top view of a polishing pad according to a twelfth embodiment of the present invention.*

DESCRIPTION OF EMBODIMENTS

Several embodiments are provided below to illustrate the polishing pad of the present invention. The material of the polishing pad and the structure of the arc grooves in the embodiments are the same and will be described only in the first embodiment. The descriptions of other embodiments will only point out the differences from the first embodiment.

The First Embodiment

Figure 1:
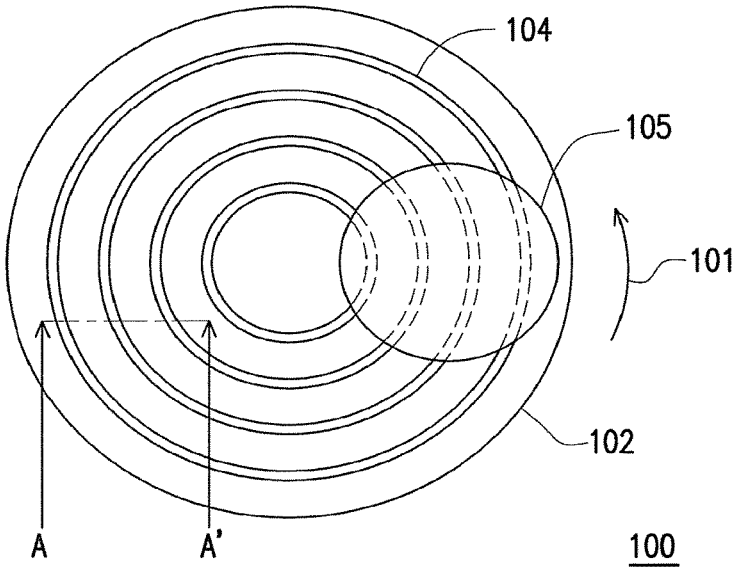
FIG. 1 (PRIOR ART)
FIG. 1 is a schematic top view of a conventional polishing pad.
Figure 1A:
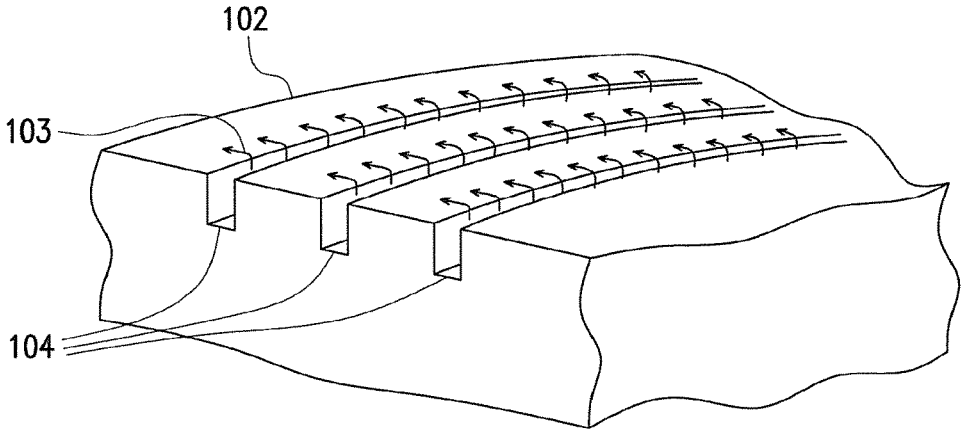
FIG. 1A (PRIOR ART)
FIG. 1A is a cross-section view of the polishing pad taken along a line A-A' in FIG. 1.
Figure 2A:
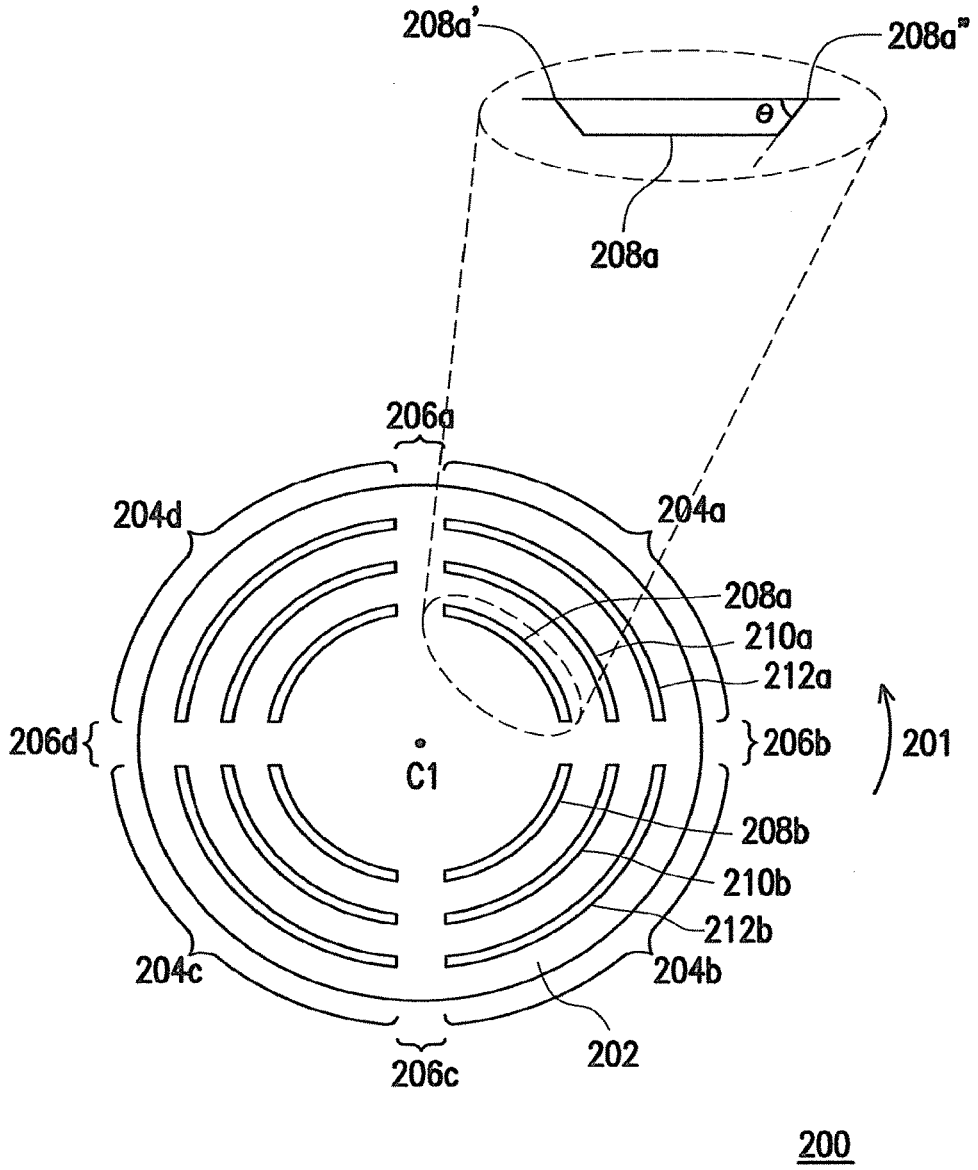
FIG. 2A is a schematic top view of a polishing pad according to a first embodiment of the present invention.

FIG. 2A is a schematic top view of a polishing pad according to a first embodiment of the present invention. On the upper right corner of FIG. 2A is a magnified cross-section view of an arc groove 208a.

Referring to FIG. 2A, a polishing pad 200 comprises a polishing layer 202 and a plurality of arc grooves 208a, 208b, 208c, 208d, 210a, 210b, 210c, 210d, 212a, 212b, 212c, and 212d. The polishing pad 200 may be made of polymer materials such as polyester, polyether, polyurethane, polycarbonate, polyacrylate, polybutadiene, or other polymers synthesized using suitable thermosetting resins or thermoplastic resins. In addition to the polymer materials, the polishing pad 200 may further include conductive materials, abrasive particles, or soluble additives in the polymer materials.

The plurality of arc grooves 208a, 208b, 208c, 208d, 210a, 210b, 210c, 210d, 212a, 212b, 212e, and 212d are disposed in the polishing layer 202 to form a plurality of fan-shaped regions 204a, 204b, 204c, and 204d. As shown in FIG. 2A, the fan-shaped region 204a comprises the arc grooves 208a, 210a, and 212a. The fan-shaped region 204b comprises the arc grooves 208b, 210b, and 212b. The fan-shaped region 204c comprises the arc grooves 208c, 210c, and 212c. The fan-shaped region 204d comprises the arc grooves 208d, 210d, and 212d.

In addition, the arc grooves 208a, 208b, 208c, 208d, 210a, 210b, 210c, 210d, 212a, 212b, 212c, and 212d are concentric arc grooves with their center overlapping with a rotational axis $C_1$ of the polishing pad, and their central angles (not shown) are all less than 180 degrees. As shown in FIG. 2A, the polishing pad includes four fan-shaped regions with central angles all less than 90 degrees. In addition, the polishing pad may selectively include two to several fan-shaped regions such that the central angles are all less than 180 degrees. For example, a selection for the polishing pad is to have three fan-shaped regions (the corresponding central angles are less than 120 degrees) to twelve fan-shaped regions (the corresponding central angles are less than 30 degrees). The corresponding central angles are from 25 degrees to 115 degrees, for example. The arc grooves 208a, 208b, 208c, and 208d are concentric arc grooves with the same radius and are distributed at the first circle counting from the rotational axis $C_1$ of the polishing pad to the outside. The arc grooves 210a, 210b, 210c, and 210d are concentric arc grooves with the same radius and are distributed at the second circle counting from the rotational axis $C_1$ of the polishing pad to the outside. The arc grooves 212a, 212b, 212c, and 212d are concentric arc grooves with the same radius and are distributed at the third circle counting from the rotational axis $C_1$ of the polishing pad to the outside. In one embodiment, the total length of the concentric arc grooves with the same radius is 55% to 95% of the projected circumference, for example. For instance, the arc grooves 208a, 208b, 208c, and 208d have the same radius r1 (not shown) and a total length thereof is between 55% and 95% of the projected circumference $2\pi r_1$.

The polishing pad 200 may further include a plurality of interposed regions 206a, 206b, 206c, and 206d alternately disposed with the fan-shaped regions 204a, 204b, 204c, and 204d. In other words, each interposed region is between two neighboring fan-shaped regions.

It should be noted that each of the arc grooves 208a, 208b, 208c, 208d, 210a, 210b, 210c, 210d, 212a, 212b, 212c, and 212d has two ends. At least one end of each of the arc grooves has an inclined wall, and the angle between the inclined wall and the surface plane of the polishing layer 202 is less than 90 degrees. The arc grooves have similar structures. The structure of the arc groove 208a is described hereinafter for the purpose of illustration. As shown in the magnified cross-section view of the arc groove 208a on the upper right corner of FIG. 2A, the arc groove 208a has two ends 208a' and 208a". A rotational direction 201 of the polishing pad 200 is counterclockwise, for example. Then, corresponding to the direction of the relative motion of the polishing pad, the front end is 208a' and the back end is 208a". In the present embodiment, the inclined wall of the arc groove 208a at the back end 208a" forms an angle θ with the surface plane of the polishing layer 202 and the angle θ is less than 90 degrees, for example, and preferably between 5 degrees and 60 degrees. The angle θ formed between the inclined wall of the arc groove 208a at the back end 208a" and the surface plane of the polishing layer 202 is less than 90 degrees. Therefore, due to the inertial force and the centrifugal force, the slurry may flow to the polishing surface of the polishing layer 202 in the interposed region 206b and the fan-shaped region 204b along the inclined wall of the arc groove 208a at the back end 208a" so as to perform polishing. Certainly, the angle formed between the inclined wall of the arc groove 208a at the front end 208a' and the surface plane of the polishing layer 202 may also be designed to be less than 90 degrees as in the case of the back end 208a", such that this polishing pad 200 is applicable for a polishing system in which the rotational direction of the polishing pad is clockwise or counterclockwise. Based on the above, the present invention provides discontinuous arc grooves in addition to a design of inclined walls of the arc grooves to effectively improve slurry flowing to the polishing surface of the polishing pad.

In addition, the polishing surface can be divided into first polishing regions and second polishing regions. The first polishing regions are between neighboring two arc grooves in the circumferential direction; that is, the first polishing regions are the interposed regions 206a, 206b, 206c, and 206d. The second polishing regions are between two neighboring arc grooves in the radial direction; that is, the second polishing regions are the fan-shaped regions 204a, 204b, 204c, and 204d. The first polishing regions (i.e. the interposed regions) will become larger gradually as the polishing surface is abraded downward. For example, because the angle formed between the inclined wall of the arc groove 208a and the surface plane of the polishing layer 202 is less than 90 degrees, or the angle formed between the inclined wall of the arc grooves 208a and the surface plane of the polishing layer 202 and the angle formed between the inclined wall of the arc grooves 208b and the surface plane of the polishing layer 202 are both less than 90 degrees, the first polishing region (i.e. the interposed region) 206b will become larger gradually along the circumferential direction as the surface of the polishing pad 200 is abraded downward. In other words, the total area of the polishing surface will become larger gradually as the polishing surface is abraded downward.

The Second Embodiment

Figure 2B:
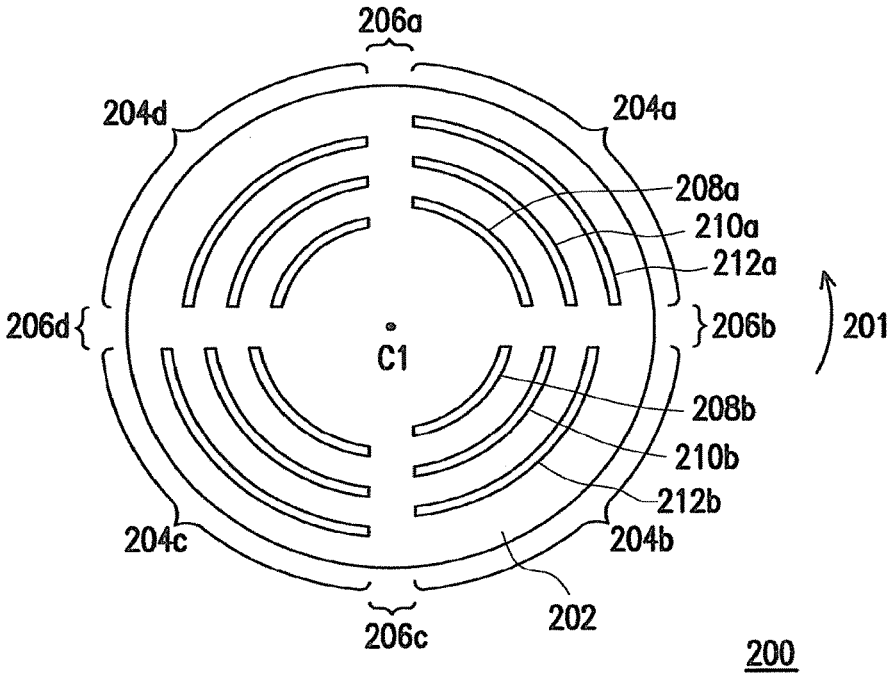
FIG. 2B is a schematic top view of a polishing pad according to a second embodiment of the present invention.

FIG. 2B is a schematic top view of a polishing pad according to a second embodiment of the present invention. The differences between the second and the first embodiments lie in that the arc grooves in the same fan-shaped region are concentric arc grooves with unequal radii but the radii of the concentric arc grooves in a fan-shaped region are unequal to the radii of the concentric arc grooves in a neighboring fan-shaped region. In other words, the projected circumferences of the concentric arc grooves in two neighboring fan-shaped regions do not overlap. Furthermore, the radii of the arc grooves in a fan-shaped region may selectively be equal to the radii of the arc grooves in a non-neighboring fan-shaped region. In other words, the projected circumferences of the concentric arc grooves in two non-neighboring fan-shaped regions overlap.

Take FIG. 2B as an example, the radii of the arc grooves in the fan-shaped regions 204a and 204c are equal and the radii of the arc grooves in the fan-shaped regions 204b and 204d are equal. However, the radii of the arc grooves in the fan-shaped regions 204a or 204c are not equal to the radii of the arc grooves in the neighboring fan-shaped regions 204b or 204d. In the present embodiment, the radii of the arc grooves in the fan-shaped regions 204a or 204c are all greater than the radii of the arc grooves in the neighboring fan-shaped regions 204b or 204d. For example, the radius of the arc groove 208a is greater than the radius of the arc groove 208b, the radius of the arc groove 210a is greater than the radius of the arc groove 210b, and the radius of the arc groove 212a is greater than the radius of the arc groove 212b. In one embodiment, the total length of the concentric arc grooves with the same radius is 15% to 45% of the projected circumference. For instance, the arc grooves 208b and 208d have the same radius r1 (not shown) and the total length between 10% and 45% of the projected circumference $2\pi r_1$.

The angle θ formed between the inclined wall at the back end of each of the arc grooves and the surface plane of the polishing layer is less than 90 degrees. Therefore, due to the inertial force and the centrifugal force, the slurry may flow to the polishing surface of the polishing layer along the inclined wall at the back end of each of the arc grooves so as to perform polishing. The present invention provides discontinuous arc grooves in addition to a design of inclined walls of the arc grooves to more effectively improve slurry flowing to the polishing surface of the polishing pad.

The Third Embodiment

Figure 2C:
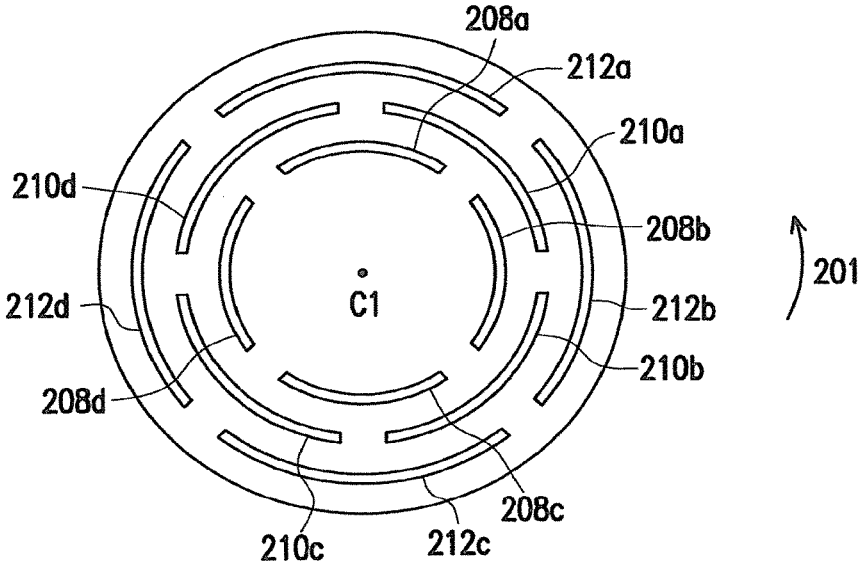
FIG. 2C is a schematic top view of a polishing pad according to a third embodiment of the present invention.

FIG. 2C is a schematic top view of a polishing pad according to a third embodiment of the present invention. The differences between the third and the first embodiments lie in that the arc grooves include concentric arc grooves with unequal radii and concentric arc grooves with the same radius. However, the concentric arc grooves at even-numbered circles and the concentric arc grooves at odd-numbered circles are alternately arranged.

For example, the arc grooves 208a, 208b, 208c, 208d, 210a, 210b, 210c, 210d, 212a, 212b, 212c, and 212d are concentric arc grooves with their center overlapping with the rotational axis $C_1$ of the polishing pad. The arc grooves 208a, 208b, 208c, and 208d on the first circle counting from the rotational axis $C_1$ of the polishing pad to the outside are alternately arranged with the arc grooves 210a, 210b, 210c, and 210d on the second circle counting from the rotational axis $C_1$ of the polishing pad to the outside, partly overlapping with each other in the radial direction. The overlapping ratio in the radial direction is between 10% and 90% of a 360 degree angle, for example. Similarly, the arc grooves 212a, 212b, 212c, and 212d on the third circle counting from the rotational axis $C_1$ of the polishing pad to the outside are alternately arranged with the arc grooves 210a, 210b, 210c, and 210d on the second circle counting from the rotational axis $C_1$ of the polishing pad to the outside, partly overlapping with each other in the radial direction. In other words, the arc grooves in the present embodiment are alternately arranged, so that the groups of fan-shaped regions and interposed regions in the first embodiment are not formed.

The angle θ formed between the inclined wall at the back end of each of the arc grooves and the surface plane of the polishing layer is less than 90 degrees. Therefore, due to the inertial force and the centrifugal force, the slurry may flow to the polishing surface of the polishing layer (including the polishing surface between two neighboring arc grooves in the circumferential direction and the polishing surface between two neighboring arc grooves in the radial direction) along the inclined wall at the back end of each of the arc grooves so as to perform polishing. The present invention provides discontinuous arc grooves in addition to a design of inclined walls of the arc grooves to more effectively improve slurry flowing to the polishing surface of the polishing pad.

The Fourth Embodiment

Figure 2D:
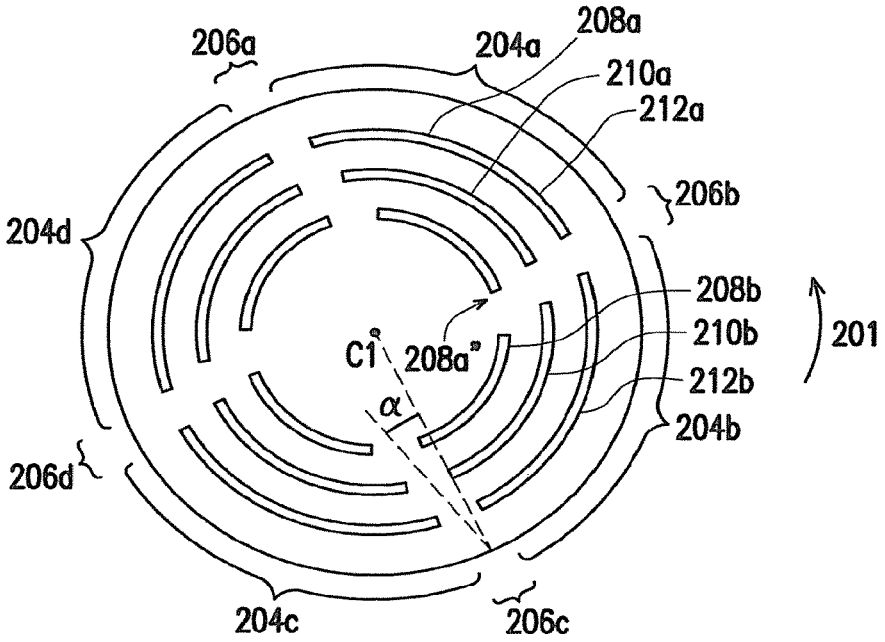
FIG. 2D is a schematic top view of a polishing pad according to a fourth embodiment of the present invention.

FIG. 2D is a schematic top view of a polishing pad according to a fourth embodiment of the present invention. The differences between the fourth and the first embodiment lie in that the interposed regions 206a, 206b, 206c, and 206d in the first embodiment are radially arranged from the rotational axis $C_1$ of the polishing pad toward the outside and are symmetric corresponding to the radius. The direction of the lengthwise extension of the interposed regions 206a, 206b, 206c, and 206d in the fourth embodiment does not pass through the rotational axis $C_1$ of the polishing pad 200 and the interposed regions 206a, 206b, 206c, and 206d in the fourth embodiment are asymmetric corresponding to the radius. The direction of the lengthwise extension of the interposed regions 206a, 206b, 206c, and 206d forms an angle of less than 90 degrees with the radial direction.

Take FIG. 2D as an example, the direction of the lengthwise extension of the interposed regions 206a, 206b, 206c, and 206d, along the opposite direction (i.e. the clockwise direction) of the rotational direction of the polishing pad, forms an angle $\alpha$ of less than 90 degrees with the radial direction. Compared to the first embodiment, the slurry may more easily flow from the back end 208a" of the arc groove 208a in an inner circle to the polishing surface and then to the arc groove 210b in an outer circle in the fourth embodiment. As such, the slurry that flows out of the polishing pad from the interposed region 206b may be reduced. Thus, the slurry may be more effectively used.

On the contrary, the direction of the lengthwise extension of the interposed regions, along the rotational direction of the polishing pad, may selectively form an angle of less than 90 degrees with the radial direction. As such, the slurry may more easily flow from the back ends of the arc grooves to the interposed regions and out of the polishing pad. The advantage of this design is that the polishing residues or byproducts generated from the polishing may be more easily removed.

The angle $\theta$ formed between the inclined wall at the back end of each of the arc grooves and the surface plane of the polishing layer is less than 90 degrees. Therefore, due to the inertial force and the centrifugal force, the slurry may flow to the polishing surface of the polishing layer along the inclined wall at the back end of each of the arc grooves so as to perform polishing. The present invention provides discontinuous arc grooves in addition to a design of inclined walls of the arc grooves to more effectively improve slurry flowing to the polishing surface of the polishing pad. In addition, the direction of the lengthwise extension of the interposed regions may depend on the requirements of the polishing process and be designed to reduce the slurry directly flowing out of the interposed regions or to efficiently remove the polishing residues or byproducts generated from the polishing.

The Fifth Embodiment

Figure 2E:
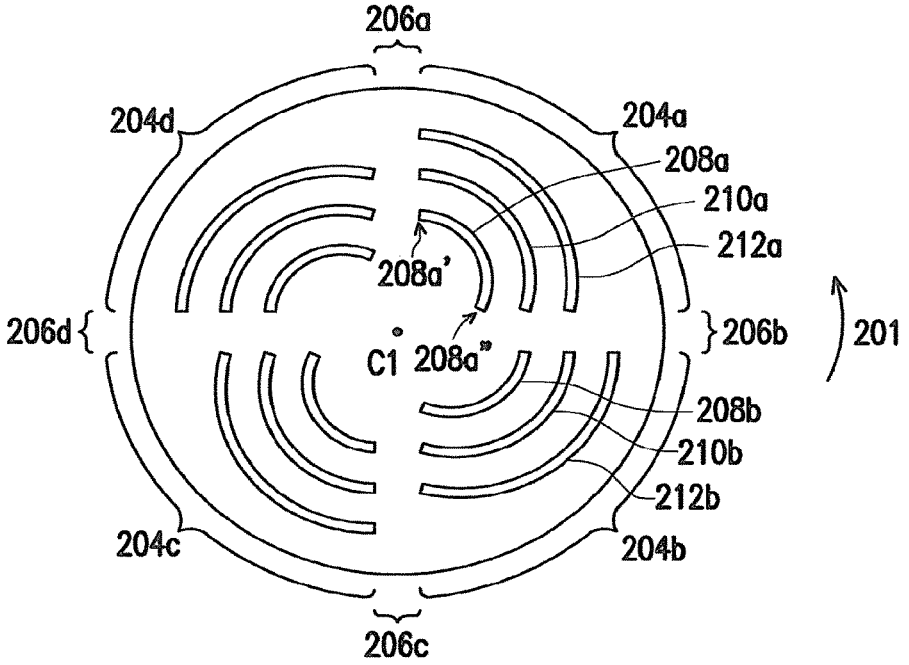
FIG. 2E is a schematic top view of a polishing pad according to a fifth embodiment of the present invention.

FIG. 2E is a schematic top view of a polishing pad according to a fifth embodiment of the present invention. The differences between the fifth and the first embodiments lie in that the arc grooves in the same fan-shaped region are concentric arc grooves with unequal radii but the center of the concentric arc grooves in one fan-shaped region does not overlap with the center of the concentric arc grooves in another fan-shaped region. In addition, the center of the concentric arc grooves of at least one fan-shaped region does not overlap with the rotational axis $C_1$ of the polishing pad 200.

For example, the concentric arc grooves 208a, 210a, and 212a in the fan-shaped region 204a are concentric arc grooves with unequal radii and with a center $C_2$ (not shown). The concentric arc grooves 208b, 210b, and 212b in the fan-shaped region 204b are concentric arc grooves with unequal radii and with a center $C_3$ (not shown). The concentric arc grooves 208c, 210c, and 212c in the fan-shaped region 204c are concentric arc grooves with unequal radii and with a center $C_4$ (not shown). The concentric arc grooves 208d, 210d, and 212d in the fan-shaped region 204d are concentric arc grooves with unequal radii and with a center $C_5$ (not shown). However, the centers of the concentric arc grooves in the fan-shaped regions do not overlap with one another. In other words, any two of the centers $C_2$, $C_3$, $C_4$, and $C_5$ do not overlap with each other. Furthermore, the centers $C_2$, $C_3$, $C_4$, and $C_5$ do not overlap with the rotational axis $C_1$ of the polishing pad 200.

That is, each of the concentric arc grooves in the fan-shaped regions whose centers do not overlap with the rotational axis $C_1$ of the polishing pad 200 has a front end and a back end with respect to the direction of the relative motion of the polishing pad 200, and a distance to the rotational axis $C_1$ gradually becomes shorter from the front end to the back end. For example, as shown in FIG. 2E, the front end of the arc groove 208a is 208a' and the back end of the arc groove 208a is 208a" with respect to the relative motion of the polishing pad 200. The front end 208a' has a longer distance to the rotational axis $C_1$ and the back end 208a" has a shorter distance to the rotational axis $C_1$.

In the present embodiment, the slurry flows from the back end 208a" of the arc groove 208a and then flows to the arc groove 208b through the surface of the interposed region 206b. The differences between the fifth and the fourth embodiments lie in that the slurry in the fourth embodiment flows more easily from the arc groove 208a on the first circle, counting from the rotational axis $C_1$ of the polishing pad to the outside, to the are groove 210b on the second circle counting from the rotational axis $C_1$ of the polishing pad to the outside. However, the slurry in the fifth embodiment flows more easily from the arc groove 208a on the first circle, counting from the rotational axis $C_1$ of the polishing pad to the outside, to the arc groove 208b on the same first circle. As such, the slurry may stay on the polishing pad 200 for longer time and be more effectively used.

On the contrary, each of the concentric arc grooves in the fan-shaped regions whose centers do not overlap with the rotational axis of the polishing pad may selectively be designed to have a front end and a back end with respect to the direction of the relative motion of the polishing pad, and a distance to the rotational axis gradually becomes longer from the front end to the back end. As such, the slurry may more easily flow from the back ends of the arc grooves to the interposed regions and out of the polishing pad. The advantage of this design is that the polishing residues or byproducts generated from the polishing may be more easily removed.

The angle $\theta$ formed between the inclined wall at the back end of each of the arc grooves and the surface plane of the polishing layer is less than 90 degrees. Therefore, due to the inertial force and the centrifugal force, the slurry may flow to the polishing surface of the polishing layer along the inclined wall at the back end of each of the arc grooves so as to perform polishing. The present invention provides discontinuous arc grooves in addition to a design of inclined walls of the arc grooves to more effectively improve slurry flowing to the polishing surface of the polishing pad. In addition, the arrangement of the fan-shaped regions may be selectively designed to keep the slurry on the polishing pad for longer time so as to more effective use the slurry, or to more efficiently remove the polishing residues or byproducts generated from the polishing.

The abovementioned five embodiments use circular arc grooves as examples for the purpose of illustration, which is not intended to limit the scope of the present invention. The shapes of the arc grooves in the present invention may be selected from the group consisting of circular arcs, elliptical arcs, parabolic arcs, irregular arcs, and combinations thereof.

In addition, in the above embodiments, the arc grooves are arranged in three circles for the purpose of illustration. However, the present invention does not limit the number of the circles of the arc grooves, which may also be less or more than three. Similarly, in the above embodiments, the polishing pad includes four fan-shaped regions for the purpose of illustration. The present invention does not limit the number of the fan-shaped regions, which may be less or more than four. Thus, the number of the interposed regions between two neighboring fan-shaped regions will also vary according to the number of the fan-shaped regions.

In addition, in the abovementioned first, second, and fifth embodiments, the interposed regions between two neighboring fan-shaped regions are rectangular or trapezoidal and are symmetric with respect to the radii. The present invention does not limit the interposed regions to be symmetric with respect to the radii. For example, in the fourth embodiment, the direction of the lengthwise extension of the interposed regions forms an angle with the radial direction, and the interposed regions are asymmetric with respect to the radii. The interposed regions may be of other shapes such as a V shape, an arc shape, or other shapes asymmetric with respect to the radii. Optionally, at least one radial extending groove may be designed in the interposed regions. The following illustrates an embodiment including radial extending grooves.

The Sixth Embodiment

Figure 3:
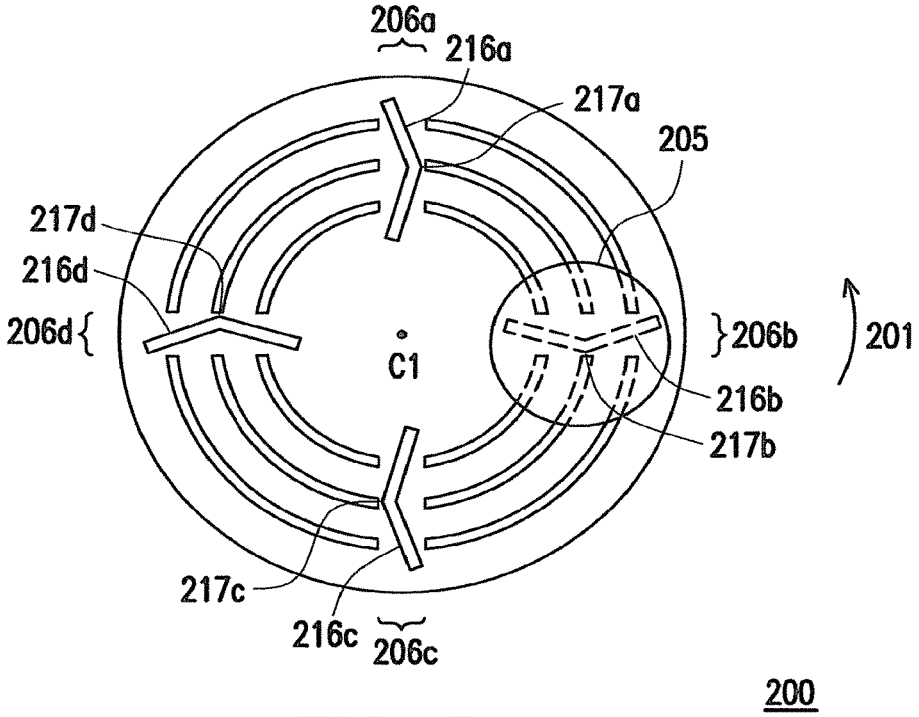
FIG. 3 is a schematic top view of a polishing pad according to a sixth embodiment of the present invention.

FIG. 3 is a schematic top view of a polishing pad according to a sixth embodiment of the present invention. The interposed regions 206a, 206b, 206c, and 206d in the sixth embodiment include at least one of the radial extending grooves 216a, 216b, 216c, and 216d. Each of the radial extending grooves 216a, 216b, 216c, and 216d has a plurality of intersections with radii of various degrees and a most backward intersection with respect to the rotational direction of the polishing pad. The radial extending grooves 216a, 216b, 216c, and 216d are respectively in the shape of a bent line, for example. The most backward part of the bent-line-shaped radial extending grooves have intersections with the radii at deflection points 217a, 217b, 217c, and 217d with respect to the rotational direction of the polishing pad. The positions of the deflection points are corresponding to the center of the substrate 205 to be polished.

With respect to the rotational direction 201 of the polishing pad, when the slurry flows from the arc grooves to the radial extending grooves 216a, 216b, 216c, and 216d, the flow of the slurry will be directed at the positions of the deflection points 217a, 217b, 217c, and 217d in order to adjust polishing profile. The deflection points correspond to the center of the substrate to be polished, which is not limited herein by the present invention. The positions of the deflection points may be designed to correspond to the edge of the substrate to be polished or other positions.

The angle θ formed between the inclined wall at the back end of each of the arc grooves and the surface plane of the polishing layer is less than 90 degrees. Therefore, due to the inertial force and the centrifugal force, the slurry may flow to the polishing surface of the polishing layer along the inclined wall at the back end of each of the arc grooves so as to perform polishing. The present invention provides discontinuous arc grooves in addition to a design of inclined walls of the arc grooves to more effectively improve slurry flowing to the polishing surface of the polishing pad. In addition, the radial extending grooves may be selectively designed to direct the flow of slurry at certain positions according to the requirements of different polishing processes.

In the abovementioned sixth embodiment, a single bent-line-shaped radial extending groove is described for the purpose of illustration, which is not intended to limit the scope of the present invention. Variations such as multiple radial extending grooves or discontinuous radial extending grooves are possible according to design requirements. Certainly, the shape of each of the radial extending grooves may vary according to design requirements and may be selected from the group consisting of a straight line, a bent line, an arc, or combinations thereof, for example.

The polishing method of the present invention using the polishing pad as above-embodied includes applying a pressure to press a substrate on the polishing pad, providing a relative motion between the substrate and the polishing pad, and optionally in conjunction with supplying a slurry or a chemical solution on the polishing pad. The characteristics of the polishing pad have been described in the description of the above-mentioned embodiments, which will not be further illustrated herein. The polishing method of the present invention may be applied in polishing the substrate for producing an industrial device of semiconductor, integrated circuit, optic, storage disk, energy conversion, micro-electro-mechanical system, communication, and display, etc, but is not intended to limit the scope of the present invention. The substrate for producing the industrial device may include semiconductor wafer, III V group wafer, storage device carrier, ceramic substrate, polymer substrate, and glass substrate, etc, but is not intended to limit the scope of the present invention.

Figure 4:
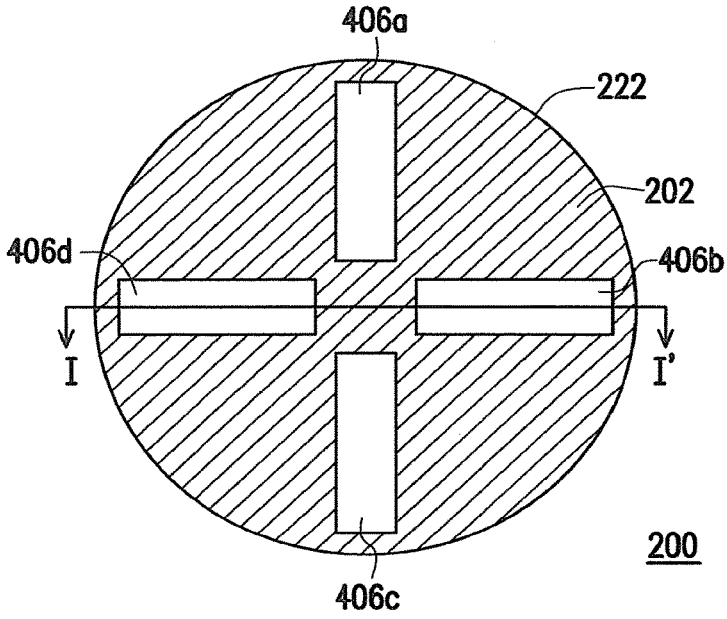
FIG. 4 is a schematic top view of a method of forming the polishing pad according to the first embodiment of the present invention.

The following describes the method of forming the polishing pad of the present invention using the polishing pad in the first embodiment shown in FIG. 2A. FIG. 4 is a schematic top view of a method of forming the polishing pad according to the first embodiment of the present invention.

First, referring to FIG. 4, a polishing pad 200 including a front surface 202 (i.e. the polishing layer) and a back surface 222 is provided. The materials of the polishing pad 200 have been described in the description of the first embodiment, which will not be further illustrated herein. Thereafter, a plurality of concave regions 406a, 406b, 406c, and 406d is formed in the polishing layer 202. Afterwards, referring to FIG. 2A, a plurality of arc grooves 208a, 208b, 208c, 208d, 210a, 210b, 210c, 210d, 212a, 212b, 212c, and 212d is formed in regions outside the concave regions 406a, 406b, 406c, and 406d.

It should be noted that the concave regions 406a, 406b, 406c, and 406d are corresponding to the interposed regions 206a, 206b, 206c, and 206d. The concave regions 406a, 406b, 406c, and 406d are temporary made recess and become flat again after the required arc grooves are formed and hence, are also called concave regions in the forming method. Therefore, the regions outside the concave regions 406a, 406b, 406c, and 406d are the corresponding fan-shaped regions 204a, 204b, 204c, and 204d. In other words, each of the concave regions is between two neighboring fan-shaped regions. Furthermore, in the method of forming the present invention, the depth of the concave regions is greater than the depth of the arc grooves.

Three forming methods of the concave regions and the arc grooves are respectively illustrated below.

The First Method

Figure 5A:
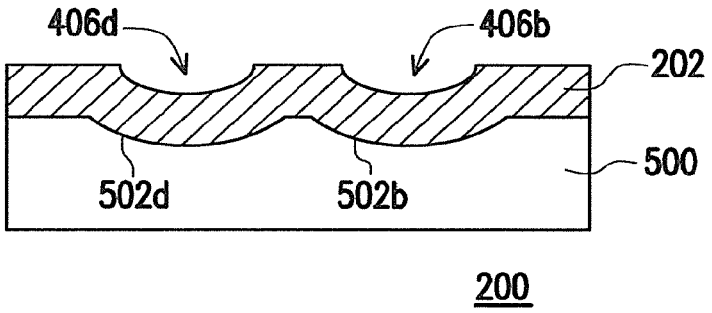
FIG. 5A is a cross-section view of the polishing pad structure taken along a line I-I' in FIG. 4 according to a first method of the present invention.

FIG. 5A is a cross-section view of the polishing pad structure taken along a line I-I' in FIG. 4 according to a first method of the present invention. First, referring to FIG. 4A and FIG. 5A, a sucker device 500 is provided and includes a plurality of recess regions 502a, 502b, 502c, and 502d respectively corresponding to the concave regions 406a, 406b, 406c, and 406d. The sucker device 500 includes a vacuum sucker device or an electrostatic sucker device. Thereafter, the concave regions 406a, 406b, 406c, and 406d are formed by using the sucker device 500 to fix the polishing pad 200. The recess regions 502a and 502c of the sucker device 500 and the corresponding concave regions 406a and 406c will show in another cross-section view. Therefore, it is not illustrated in FIG. 5A. Afterwards, referring to FIG. 2A, a plurality of arc grooves 208a, 208b, 208c, 208d, 210a, 210b, 210c, 210d, 212a, 212b, 212c, and 212d is formed in regions outside the concave regions 406a, 406b, 406c, and 406d (i.e. the fan-shaped regions 204a, 204b, 204c, and 204d) 04a, 204b, 204c, and 204d).

The Second Method

Figure 5B:
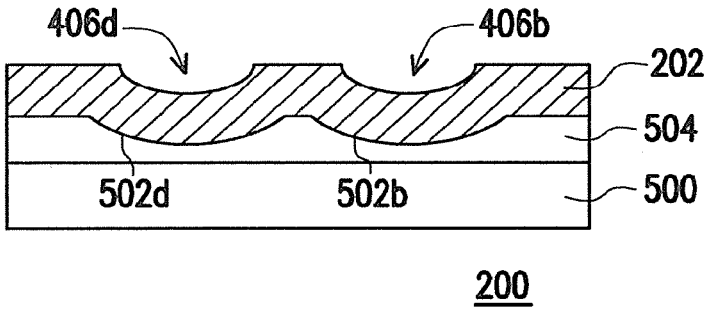
FIG. 5B is a cross-section view of the polishing pad structure taken along a line I-I' in FIG. 4 according to a second method of the present invention.

FIG. 5B is a cross-section view of the polishing pad structure taken along a line I-I' in FIG. 4according to a second method of the present invention. First, referring to FIG. 4A and FIG. 5B, a sucker device 500 and a gasket 504 are provided. The gasket 504 includes a plurality of recess regions 506a, 506b, 506c, and 506d respectively corresponding to the concave regions 406a, 406b, 406c, and 406d. The sucker device 500 includes a vacuum sucker device or an electrostatic sucker device. Thereafter, the concave regions 406a, 406b, 406c, and 406d are formed by using the sucker device 500 and the gasket 504 to fix the polishing pad 200. The recess regions 506a and 506c of the gasket 504 and the corresponding concave regions 406a and 406c will show in another cross-section view. Therefore, it is not illustrated in FIG. 5B. Afterwards, referring to FIG. 2A, a plurality of arc grooves 208a, 208b, 208c, 208d, 210a, 210b, 210c, 210d, 212a, 212b, 212c, and 212d is formed in regions outside the concave regions 406a, 406b, 406c, and 406d (i.e. the fan-shaped regions 204a, 204b, 204c, and 204d).

The Third Method

First, a plurality of recess regions (not shown) are formed in the back surface 222 of the polishing pad and respectively correspond to the concave regions 406a, 406b, 406c, and 406d. Thereafter, a sucker device 500 is provided to fix the polishing pad 200 to form the concave regions 406a, 406b, 406c, and 406d as shown in FIG. 4. The sucker device 500 includes a vacuum sucker device or an electrostatic sucker device. Afterwards, referring to FIG. 2A, a plurality of arc grooves 208a, 208b, 208c, 208d, 210a, 210b, 210c, 210d, 212a, 212b, 212c, and 212d is formed in regions outside the concave regions 406a, 406b, 406c, and 406d (i.e. the fan-shaped regions 204a, 204b, 204c, and 204d). After the arc grooves are formed, the back surface 222 of the polishing pad including a plurality of recess regions may selectively be smoothed out.

The method of forming the polishing pad of the first embodiment may be slightly modified to form the polishing pads of the other embodiments. For example, as shown in FIG. 2C, with the same arrangement of the concave regions as the first embodiment, the polishing pad of the third embodiment may be formed by finishing the process of forming the concave regions and arc grooves in two steps, wherein the grooves at even-numbered circles are formed in one step and the grooves at odd-numbered circles are formed in the other step. The polishing pad 200 is rotated by an angle between the two steps. As such, the concentric arc grooves at even-numbered circles and the concentric arc grooves at odd-numbered circles are alternately arranged.

Furthermore, when forming a plurality of concave regions in the polishing layer 202, the arrangement of the concave regions in the first embodiment is changed from being radially arranged from the rotational axis $C_1$ of the polishing pad 200 to making the direction of the lengthwise extension of the concave regions foim an angle less than 90 degrees with the radial direction. Other steps of the method stay unchanged and the polishing pad of the fourth embodiment may be formed, as shown in FIG. 2D.

The polishing pads of the first, third, and fourth embodiments formed by the method of the present invention have arc grooves including concentric arc grooves of unequal radii and concentric arc grooves of the same radius. The arc grooves in a same fan-shaped region are concentric arc grooves of unequal radii. Furthermore, the total length of the concentric arc grooves with the same radius is 55% to 95% of the projected circumference, for example. The above characteristics have been described in the description of the first embodiment, which will not be further illustrated herein.

The polishing pad of the second embodiment as shown in FIG. 2B or the polishing pad of the fifth embodiment as shown in FIG. 2E may selectively have the same arrangement of the concave regions as in the first embodiment. The arc grooves may be formed later using a milling machine process. Alternatively, the design of the concave region arrangement may also selectively be different from the first embodiment. The arc grooves may be formed using a lathe machine process, which is described in more detail in the following.

Figure 6:
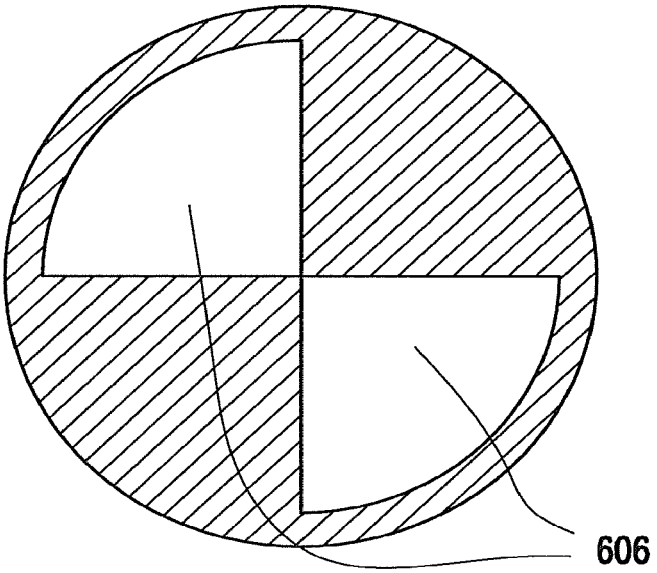
FIG. 6 is a schematic top view of a method of forming the polishing pad according to the second embodiment of the present invention.

As shown in FIG. 2B, the polishing pad of the second embodiment may have the same arrangement of a concave region 606 as shown in FIG. 6. The process of forming the concave regions and the arc grooves is finished in two steps, wherein the arc grooves in the fan-shaped regions 204a and 204c as shown in FIG. 2B are formed in one step and the arc grooves in the fan-shaped regions 204b and 204d are formed in the other step. The polishing pad 200 is rotated by an angle of about 90 degrees between the two steps. As such, the radii of the concentric arc grooves in one fan-shaped region are unequal to the radii of the concentric arc grooves in a neighboring fan-shaped region but are equal to the radii of the concentric arc grooves in a non-neighboring fan-shaped region.

Figure 7:
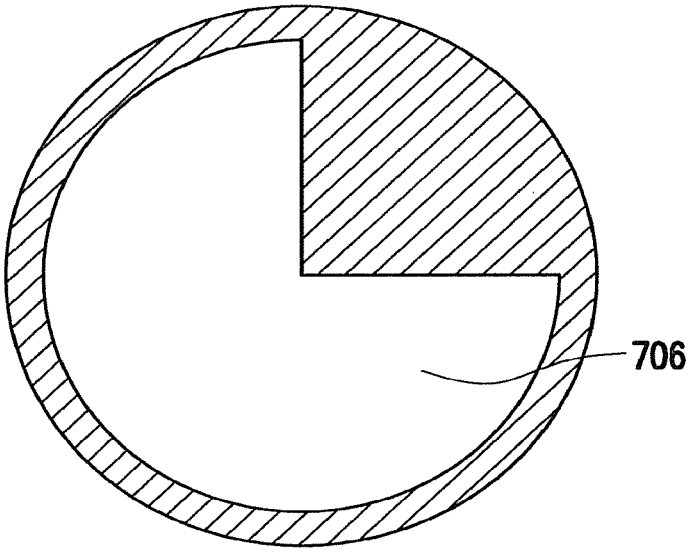
FIG. 7 is a schematic top view of a method of forming the polishing pad according to the fifth embodiment of the present invention.

As shown in FIG. 2E, the polishing pad of the fifth embodiment may have the same arrangement of a concave region 706 as shown in FIG. 7. The process of forming the concave regions and the arc grooves is finished in four steps. The polishing pad 200 is rotated by an angle of about 90 degrees and shifted for a distance between the four steps. As such, the center of the concentric arc grooves of each fan-shaped region does not overlap with the center of the concentric arc grooves of another fan-shaped region and also does not overlap with the rotational axis $C_1$ of the polishing pad 200.

The abovementioned method of forming the arc grooves further includes a lathe machine process or a milling machine process, for example. For example, in the lathe machine process, the polishing pad 200 including the concave regions 406a, 406b, 406c, and 406d is placed on a lathe machine (not shown), and the cutting tool on the machine is moved in conjunction with rotating the polishing pad 200, so as to form the plurality of arc grooves 208a, 208b, 208c, 208d, 210a, 210b, 210c, 210d, 212a, 212b, 212c, and 212d in the polishing pad 200. Alternatively, the polishing pad 200 including the concave regions 406a, 406b, 406c, and 406d is fixed on the milling machine (not shown). The drill and other tools on the machine are rotated to form the plurality of arc grooves 208a, 208b, 208c, 208d, 210a, 210b, 210c, 210d, 212a, 212b, 212c, and 212d in the polishing layer 202. The depth of the concave regions is greater than the depth of the arc grooves; thus, the distance of the vertical movement of the above mechanical processing tools can be fixed so that the arc grooves are not formed in the concave regions. Moreover, the depth at the edge of the concave regions gradually becomes deeper, so that the inclined walls at the ends of the arc grooves form an angle of less than 90 degrees with the surface plane of the polishing layer.

If a polishing pad with radial extending grooves is to be formed, as shown in FIG. 3, the milling machine process is used, for example. In the milling machine process, for example, the polishing pad 200 including the concave regions 406a, 406b, 406c, and 406d is fixed on the milling machine (not shown). The drill and other tools on the machine are rotated to form the plurality of radial extending grooves in the polishing layer 202.

*The Seventh Embodiment*

*FIG. 8 is a schematic top view of a polishing pad according to a seventh embodiment of the present invention. This embodiment is similar to the fifth embodiment depicted in FIG. 2E, but with the interposed regions 206a, 206b, 206c, and 206d including at least one of the bent line radial extending grooves 216a, 216b, 216c, and 216d.*

*The Eighth Embodiment*

*FIG. 9 is a schematic top view of a polishing pad according to an eighth embodiment of the present invention. This embodiment is similar to the fifth embodiment depicted in FIG. 2E, but with the interposed regions 206a, 206b, 206c, and 206d including at least one of the arc radial extending grooves 216a, 216b, 216c, and 216d.*

*The Ninth Embodiment*

*FIG. 10 is a schematic top view of a polishing pad according to a ninth embodiment of the present invention. This embodiment is similar to the fifth embodiment depicted in FIG. 2E, but with the interposed regions 206a, 206b, 206c, and 206d including at least one of the straight line radial extending grooves 216a, 216b, 216c, and 216d.*

*The Tenth Embodiment*

*FIG. 11 is a schematic top view of a polishing pad according to a tenth embodiment of the present invention. This embodiment is similar to the fifth embodiment depicted in FIG. 2E, but the arc grooves 208a, 210a, and 212a in the tenth embodiment are elliptical rather than circular.*

*The Eleventh Embodiment*

*FIG. 12 is a schematic top view of a polishing pad according to an eleventh embodiment of the present invention. This embodiment is similar to the fifth embodiment depicted in FIG. 2E, but the arc grooves 208a, 210a, and 212a in the eleventh embodiment are parabolic rather than circular.*

*The Twelfth Embodiment*

*FIG. 13 is a schematic top view of a polishing pad according to a twelfth embodiment of the present invention. This embodiment is similar to the fifth embodiment depicted in FIG. 2E, but the arc grooves 208a, 210a, and 212a in the twelfth embodiment are irregular rather than circular.*

Although the present invention has been disclosed above by the embodiments, they are not intended to limit the present invention. Anybody skilled in the art can make some modifications and alterations without departing from the spirit and scope of the present invention. Therefore, the protected range of the present invention falls in the appended claims.

What is claimed is:

1. A polishing pad, comprising:

a polishing layer; and a plurality of arc grooves, disposed in the polishing layer and forming a plurality of fan-shaped regions, wherein the plurality of arc grooves in the same fan-shaped region are concentric arc grooves with unequal radii, and a *radial* center of the concentric arc grooves in at least one fan-shaped region does not overlap with a rotational axis of the polishing pad, *wherein one or both of the following conditions is satisfied:*

(*a*) *the radial center of the concentric arc grooves in at least one fan-shaped region is located inside the polishing layer and spaced apart from an outer circumferential edge of the polishing layer, and*

(*b*) *each of the concentric arc grooves in the at least one fan-shaped region has two ends, at least one of the ends located inside the polishing layer and spaced apart from the outer circumferential edge of the polishing layer.*

2. The polishing pad according to claim 1, wherein with respect to a relative motion of the polishing pad, each of the plurality of arc grooves has a front end and a back end, at least the back end thereof has an inclined wall, and an angle between the inclined wall and a surface plane of the polishing layer is less than 90 degrees.

3. The polishing pad according to claim 2, wherein the angle is between 5 and 60 degrees.

4. The polishing pad according to claim 1, wherein each of the concentric arc grooves in the fan-shaped region whose center does not overlap with the rotational axis of the polishing pad has a front end and a back end with respect to a relative motion of the polishing pad, and *each of the concentric arc grooves in the fan-shaped region whose center dose not overlap with the rotational axis of the polishing pad has* a distance to the rotational axis gradually [becomes] *becoming* shorter or longer from the front end to the back end.

5. The polishing pad according to claim 1, further comprising an interposed region between two neighboring fan-shaped regions.

6. The polishing pad according to claim 5, wherein the interposed region further comprises at least one radial extending groove.

7. The polishing pad according to claim 6, a shape of the radial extending groove is selected from the group consisting of a straight line, a bent line, an arc, and combinations thereof.

8. A method of forming a polishing pad, comprising:

providing a polishing layer;

forming a plurality of concave regions in the polishing layer; [and]

forming a plurality of arc grooves in regions outside the concave regions; *and*

*recovering the concave regions to form a smooth surface in the polishing layer,* wherein each of the plurality of arc grooves has two ends, at least one end thereof has an inclined wall, and an angle between the inclined wall and a surface plane of the polishing layer is less than 90 degrees.

9. The method of forming the polishing pad according to claim 8, wherein the method of forming the plurality of concave regions and the plurality of arc grooves comprises:

providing a sucker device, wherein the sucker device comprises a plurality of recess regions corresponding to the plurality of concave regions; fixing the polishing pad using the sucker device to form the concave regions; and forming the plurality of arc grooves in the regions outside the concave regions.

10. The method of forming the polishing pad according to claim 8, wherein a method of forming the plurality of concave regions and the plurality of arc grooves comprises:

providing a sucker device and a gasket, wherein the gasket comprises a plurality of recess regions corresponding to the concave regions; fixing the polishing pad using the sucker device and the gasket to form the plurality of concave regions; and forming the plurality of arc grooves in the regions outside the plurality of concave regions.

11. The method of forming the polishing pad according to claim 8, wherein a method of forming the plurality of concave regions and the plurality of arc grooves comprises:

forming a plurality of recess regions corresponding to the plurality of concave regions in a back surface of the polishing pad; providing a sucker device to fix the polishing pad to form the plurality of concave regions; and forming the plurality of arc grooves in the regions outside the plurality of concave regions.

12. The method of forming the polishing pad according to claim 8, wherein a method of forming the plurality of concave regions comprises providing a vacuum sucker device or an electrostatic sucker device.

13. The method of forming the polishing pad according to claim 8, wherein a depth of the plurality of concave regions is greater than a depth of the plurality of arc grooves.

14. The method of forming the polishing pad according to claim 8, wherein the regions outside the plurality of concave regions are a plurality of fan-shaped regions and the plurality of concave regions are between two neighboring fan-shaped regions.

15. The *method of forming the* polishing pad according to claim 14, wherein the plurality of arc grooves in the same fan-shaped region are concentric arc grooves with unequal radii.

16. The *method of forming the* polishing pad according to claim 8, wherein the plurality of arc grooves comprise concentric arc grooves with unequal radii and concentric arc grooves with the same radius.

17. The *method of forming the* polishing pad according to claim 16, wherein the concentric arc grooves with the same radius have a total length between 55% and 95% of a projected circumference.

18. The *method of forming the* polishing pad according to claim 16, wherein the concentric arc grooves with the same radius have a total length between 15% and 45% of a projected circumference.

19. The *method of forming the* polishing pad according to claim 16, wherein the concentric arc grooves at even-numbered circles and the concentric arc grooves at odd-numbered circles are alternately arranged.

20. The *method of forming the* polishing pad according to claim 19, wherein the concentric arc grooves at the even-numbered circles and the concentric arc grooves at the odd-numbered circles are formed by a process of forming the plurality of concave regions and the plurality of arc grooves in two steps, and the polishing pad is rotated by an angle between the two steps.

21. The *method of forming the* polishing pad according to claim 15, wherein a center of the concentric arc grooves in one fan-shaped region does not overlap with a center of the concentric arc grooves in another fan-shaped region.

22. The *method of forming the* polishing pad according to claim 15, wherein the radii of the concentric arc grooves in a fan-shaped region are unequal to the radii of the concentric arc grooves in a neighboring fan-shaped region but are equal to the radii of the concentric arc grooves in a non-neighboring fan-shaped region.

23. A method of producing an industrial device comprising:

at least a step of polishing a substrate by using [the] *a* polishing pad [according to claim 1], *the polishing pad comprising:*

*a polishing layer; and*

*a plurality of arc grooves, disposed in the polishing layer and forming a plurality of fan-shaped regions,*

*wherein the plurality of arc grooves in the same fan-shaped region are concentric arc grooves with unequal radii, and*

*a radial center of the concentric arc grooves in at least one fan-shaped region does not overlap with a rotational axis of the polishing pad, wherein one or both of the following conditions is satisfied:*

*(a) the radial center of the concentric arc grooves in at least one fan-shaped region is located inside the polishing layer and spaced apart from an outer circumferential edge of the polishing layer, and*

*(b) each of the concentric arc grooves in the at least one fan-shaped region has two ends, at least one of the ends located inside the polishing layer and spaced apart from the outer circumferential edge of the polishing layer.*

*24. The polishing pad according to claim 1, wherein shapes of the plurality of arc grooves are selected from the group consisting of circular arcs, elliptical arcs, parabolic arcs, irregular arcs, and combinations thereof.*

* * * * *